Figures 5, 7:
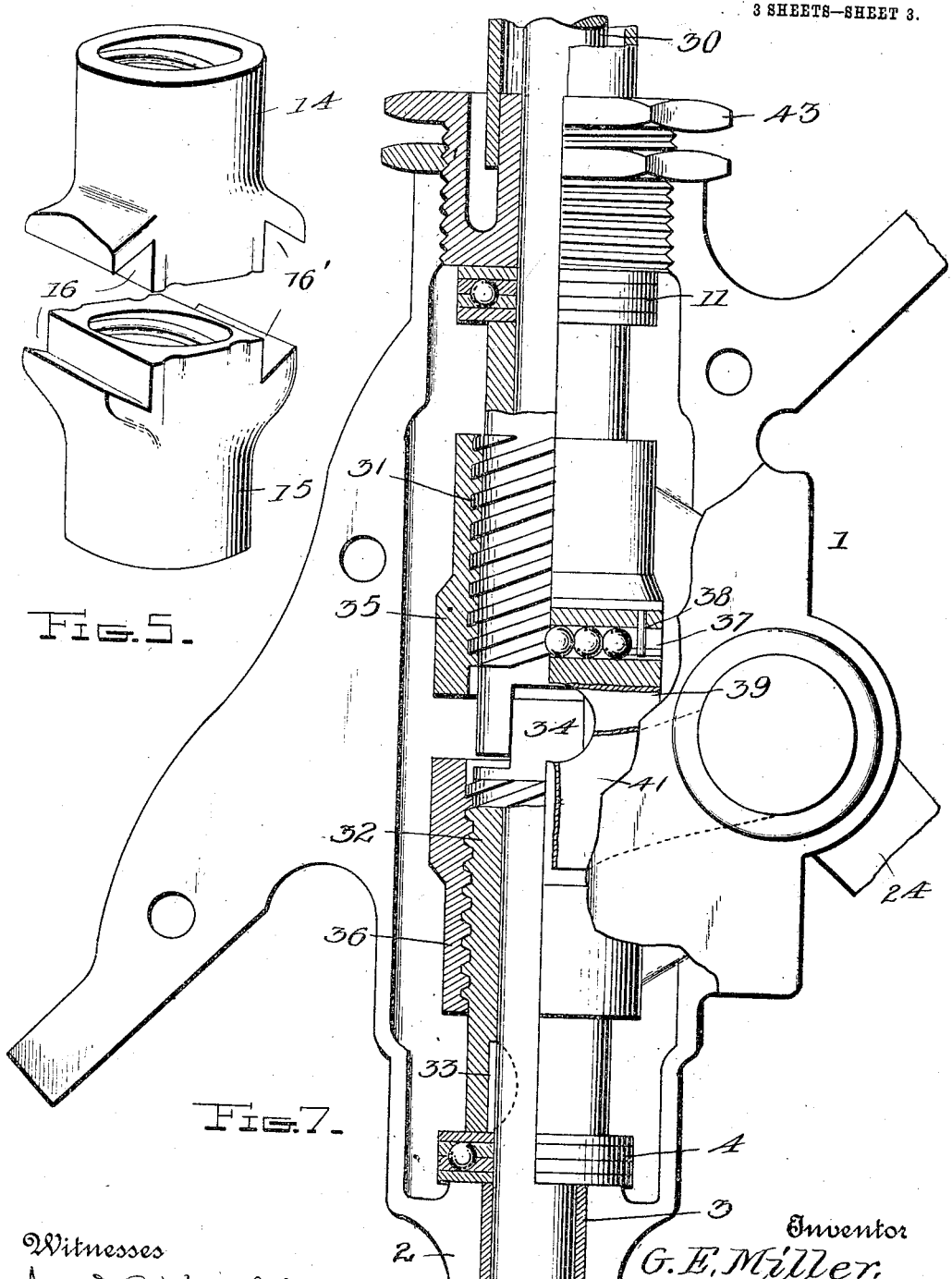

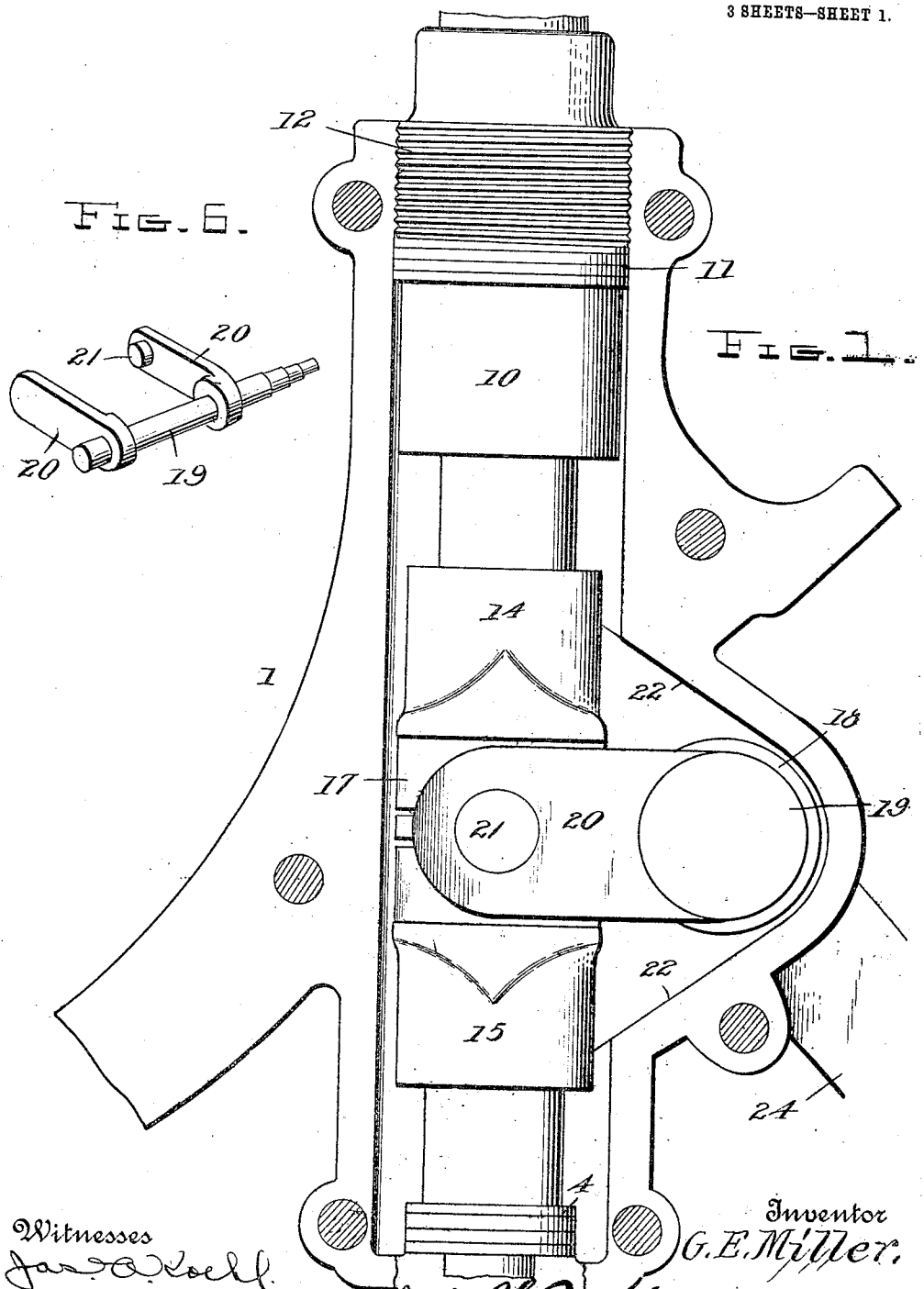

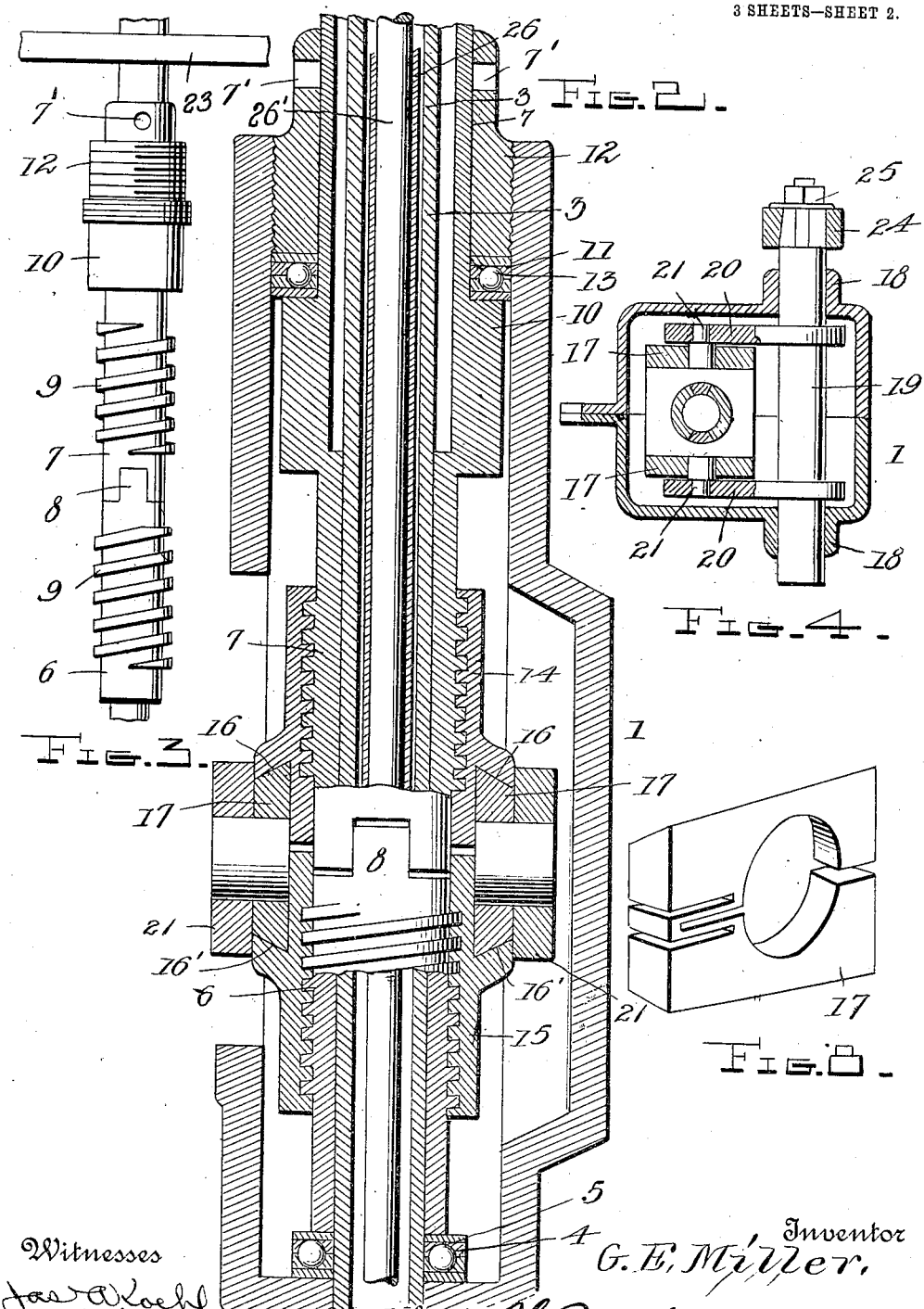

No. 885,940. PATENTED APR. 28, 1908.
G. E. MILLER.
STEERING GEAR FOR AUTOMOBILES.
APPLICATION FILED MAY 18, 1907.

3 SHEETS—SHEET 3.

Witnesses
Inventor
G. E. Miller.
by
Attorneys

UNITED STATES PATENT OFFICE.

GROVE E. MILLER, OF WEST DETROIT, MICHIGAN.

STEERING-GEAR FOR AUTOMOBILES.

No. 885,940.          Specification of Letters Patent.        Patented April 28, 1908.

Application filed May 18, 1907. Serial No. 374,361.

*To all whom it may concern:*

Be it known that I, GROVE E. MILLER, a citizen of the United States, residing at West Detroit, in the county of Wayne and State of Michigan, have invented certain new and useful Improvements in Steering-Gears for Automobiles; and I do declare the following to be a full, clear, and exact description of the invention, such as will enable others skilled in the art to which it appertains to make and use the same.

This invention relates to improvements in steering gears for automobiles or other vehicles.

The object of the invention is to provide a steering gear of this character which will not be reversed by the axle on any of the wheels coming into contact with an obstruction.

With the above and other objects in view which will appear as the nature of the invention is better understood, the invention consists in certain novel features of construction, combination and arrangement of parts as will be hereinafter fully described and claimed.

In the accompanying drawings, Figure 1 represents a side elevation of the gear, one member of the casing being removed; Fig. 2 represents a longitudinal vertical section taken at right angles to Fig. 1, both members of the casing being in position; Fig. 3 represents a side elevation of the operating screw showing the clutch connection between the parts thereof; Fig. 4 represents a transverse section taken on a line with the rocker shaft; Fig. 5 represents a perspective view of the clamping nuts arranged in juxtaposition ready for assembling; Fig. 6 represents a perspective view of the rocker shaft and the parts carried thereby detached; Fig. 7 represents a side elevation partly in section of a modified form of steering gear, and Fig. 8 represents a perspective view of one of the bearing blocks detached.

In the embodiment illustrated in Figs. 1 to 6, a suitably mounted casing 1 is preferably formed in two or more sections bolted together, as shown. The lower end of the casing has an extension or sleeve 2 in which is adapted to be secured the lower end of a centrally-disposed upwardly-projecting pivot or dead shaft 3. This shaft 3 extends upwardly through the casing 1 and the tubular steering post of the gear. Around the shaft 3 at the lower end of the casing 1 is secured an annular ball-race 4 in which is disposed a series of bearing balls 5.

Revolubly mounted on the shaft 3 is a two-part threaded sleeve or tubular operating screw, said sleeve or hollow screw being formed in two sections 6 and 7, the meeting ends of which are adjustably secured together by a clutch connection 8, as shown. Each of the sections of the sleeve or screw is provided with a coarse screw-thread 9 of the same pitch, the arrangement of which forms practically a continuous screw. The lower end of the lower section 6 of the screw bears on the balls 5 in the race 4 at the bottom of the casing. The upper end of the upper section 7 of the sleeve or screw is provided with an annular enlargement or head 10 on the upper end of which is formed one member of a ball-race 11, the other member of which is formed in an adjusting sleeve or collar 12 which surrounds the extended unthreaded end of the screw section 7 and is adapted to be screwed into the interiorly threaded upper end of the casing 1 and forms an adjusting member as hereinafter described. In the race formed by the head 10 and adjusting member 12 is arranged a series of bearing balls 13. By providing a screw-threaded connection for the member 12 in the end of the casing, the upper section 7 of the threaded sleeve or screw may always be kept in close engagement with the lower section, thereby compensating for the wear of the threads or other parts on said sleeve. This sleeve or collar 12 is provided with means whereby it may be screwed into the threaded upper end of the casing, being here shown as apertures 7' to receive a pin.

Arranged on the threaded sleeve or screw is a pair of clamping nuts as 14 and 15, said nuts being preferably provided with rectangular heads in two of the opposite faces of which are formed oppositely-disposed undercut grooves or recesses 16 and 16' which form seats for bearing blocks as 17 which are removably arranged therein.

Journaled in suitable bearings 18 on opposite sides of the casing 1 is a transversely-disposed rock-shaft 19 on which is fixed a pair of spaced rocker arms as 20 arranged to embrace the opposite sides of the clamping nuts and having secured thereto inwardly-projecting trunnions 21 which fit in apertures in the bearing blocks 17 whereby when said clamping blocks are shifted in one direction, or the other by the threaded operating screw, said arms 20 will be rocked to turn the shaft 19 in one direction or the other. The blocks 17 are slotted at opposite sides from the trunnion opening therein outward, the slots at one side being staggered so that when the blocks are compressed, the holes will contract to take up the wear on the trunnions. The movement of the rocker arms 20 is limited in either direction by the diverging side walls 22 of the casing 1 in which the shaft 19 is mounted.

Formed integral with the upper section 7 of the threaded sleeve or screw is a steering wheel 23 shown in Fig. 3. The pivot shaft 3 is preferably extended upwardly through the wheel 23 to support a quadrant for the steering levers. On one end of the rock shaft 19 is formed a head on which is adapted to be arranged a removable crank or rocker arm 24, to the lower end of which is attached suitable steering connections (not shown), said rocker arm being preferably secured on the head of the shaft by means of a clamping nut and washer 25. Arranged within the tubular shaft 3 is a smaller tube 26 and a rod 26' to which are connected the controlling levers (not shown).

In the above described form, the shaft 3 is a dead post which performs the double function of carrying a quadrant for the controlling levers, and as an axis for the screws 6 and 7. The outer tube, on the lower end of which is formed the screw section 7, is the live post or post to which the steering wheel is fastened.

By screwing the nut or collar 12 down on the head 10 of the upper screw member 7 and forcing said screw down, which is permitted by the slack in the clutch, the upper nut 14 is forced down on the sliding blocks which in turn are compressed on the trunnion pins thereby taking up the wear in the nuts, sliding blocks and trunnions. The threads on the screws and nuts 14 and 15 are of equal length and the sliding blocks and recesses are of the same length and on a neutral or midway point so that no shoulders can be worn on any of the working parts.

In the form shown in Fig. 7, the same construction of screw and nuts is shown as in Figs. 1 to 6, but instead of the outer post being the live one, it is released and the inner tube or rod 30 is the steering wheel post which passes down through the upper screw 31 and is fastened to the lower screw 32 by a key 33 and projects below to form a bearing. The upper screw is driven by the lower screw by means of the male and female clutch 34. Both the upper and lower screws carry nuts 35 and 36 of the same form and construction, and on one side of each is arranged a row of balls in retainers as 37 fastened to the nuts by pins 38. Between these balls works a sliding block 39 which is pivoted on trunnion pins fastened in the rocker arms 41.

The operation is as follows:—The threads of both screws being of the same pitch, either right or left give the same relative movement to the nuts up and down as to the direction of rotation of the steering wheel which imparts movement to the rocker arm and in turn operates the steering arm to which is connected the wheels of the car or other vehicle. The parts are adjusted by screwing down the nut or collar 43 which forces the upper screw and its nut down on the sliding block 39 and on the lower nut and screw which is then thrust on the lower ball thrust bearing, thereby taking up all wear and lost motion in both nuts and the sliding block 39. The motion differs in the mechanism of the gear shown in Fig. 7 and that shown in Figs. 1 to 6 as the ball bearing sliding block 39, the use of which eliminates the side stress on the nuts by giving an oscillating movement of the rocker arms and ball-end thrust on the screws; also in Figs. 1 to 6, the live post is fastened to the upper screw and in Fig. 7, the live post is fastened to the lower screw. The gear may be constructed in either way to suit the location of the controlling levers on top or under the steering wheel.

Having thus described my invention, what I claim is:—

1. In a steering gear, the combination of a driving screw member, a driven screw member, a clutch connection between said members, nuts mounted on said screw members, a bearing block arranged between said nuts, a rock shaft connected with said block and means for compressing said block between said nuts.

2. In a steering gear, the combination of a driving screw member, a driven screw member, a clutch connection between said members, nuts mounted on said screw members, said nuts having oppositely-disposed grooves or recesses arranged in one side thereof, a slotted bearing block arranged in said grooves, a rock shaft connected with said block and means for compressing said block between said nuts.

3. In a steering gear, the combination of a driving screw member, a driven screw member, a clutch connection between said members, nuts mounted on said screw members and having oppositely-disposed grooves or recesses arranged in one side thereof, a slotted bearing block arranged in said grooves, a rock shaft mounted adjacent said nuts and having an arm connected with said bearing block and means for compressing said block between said nuts.

4. In a steering gear, the combination of a driving screw member, a driven screw member, a clutch connection between said members, nuts mounted on said screw members and having grooves arranged in one side thereof, slotted or split bearing blocks arranged between said nuts in said grooves, a rock-shaft mounted adjacent said nuts and having an arm provided with a trunnion adapted to engage said bearing-block and means for compressing said block between said nuts.

5. In a steering gear, the combination of a casing, a driving screw member mounted therein, a driven screw member mounted in said casing, a clutch connection between said members, a steering post connected with said driving member, nuts mounted on said screw members, a slotted bearing block arranged between said nuts, a rock-shaft connected with said block, and an adjusting member mounted on one of said screw members and having means for engaging the casing.

6. In a steering gear, the combination with a casing, a shaft extending longitudinally therethrough, exteriorly threaded sleeves or hollow screws revolubly mounted on said shaft and having a clutch connection between their meeting ends, the pitch of the threads of each of said sleeves being the same, clamping nuts carried by said sleeves, a sliding block arranged between said nuts, a rock shaft mounted in said casing, means connecting said rock shaft with said block, means for connecting said rock shaft with the axle of a vehicle, and a steering post connected with one of said sleeves.

7. In a steering gear, the combination with a casing, of a shaft extending longitudinally therethrough, exteriorly screw-threaded sleeves revolubly mounted on said shaft, and having a clutch connection between them, a steering post connected to one of said sleeves, clamping nuts arranged on said sleeve, bearing blocks arranged between said nuts, a transversely disposed rock shaft mounted in said casing and having spaced rocker arms secured at one end thereto, trunnions secured to said arms and adapted to engage said bearing blocks and a crank lever operated by said rock shaft.

8. In a steering gear, the combination of two separably connected screw members having threads of the same pitch, nuts mounted on said screw members and operable in the same direction thereby, and means for forcing said nuts together to take up the wear on their respective working parts.

9. In a steering gear, the combination of two separably connected screw members having threads of the same pitch, nuts mounted on said screw members and operable in the same direction thereby, and means for forcing said nuts together to take up the wear on their respective working parts, one of said nuts being connected to impart action to the steering arm in one direction and the other nut connected to operate it in the reverse direction.

In testimony whereof I have hereunto set my hand in presence of two subscribing witnesses.

GROVE E. MILLER.

Witnesses:
 ISAAC VAN SICKLE,
 ERNEST I. PRIOR.